(12) United States Patent
Johnson et al.

(10) Patent No.: US 9,821,762 B2
(45) Date of Patent: Nov. 21, 2017

(54) SEAT BELT BUCKLE (71) Applicant: LITTELFUSE, INC., Chicago, IL (US)

(72) Inventors: Brian Johnson, Saltash (GB); Samuel Fuller, Norfolk (GB)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 14/988,837

(22) Filed: Jan. 6, 2016

(65) Prior Publication Data

US 2016/0200290 A1 Jul. 14, 2016

Related U.S. Application Data (60) Provisional application No. 62/103,535, filed on Jan. 14, 2015, provisional application No. 62/101,650, filed on Jan. 9, 2015.

(51) Int. Cl.
*B60R 22/48* (2006.01)
*A44B 11/25* (2006.01)
*H01H 1/36* (2006.01)

(52) U.S. Cl.
CPC .......... *B60R 22/48* (2013.01); *A44B 11/2534* (2013.01); *H01H 1/36* (2013.01); *B60R 2022/4816* (2013.01)

(58) Field of Classification Search
CPC ............ B60R 22/48; H01H 1/36; A44B 11/25
USPC ....... 200/61.58 B, 61.58 R, 61.59; 340/457.1
See application file for complete search history.

(56) References Cited

U.S. PATENT DOCUMENTS

| 4,163,128 | A | * | 7/1979 | Miskowicz | ............. | B60R 22/48 200/61.58 B |
| 5,590,904 | A | * | 1/1997 | Ellis | ........................ | B60R 22/48 180/268 |
| 5,970,587 | A | | 10/1999 | Knox | | |
| 7,296,825 | B1 | * | 11/2007 | Zia | .......................... | B60R 22/48 180/268 |
| 2005/0146420 | A1 | | 7/2005 | Ebert | | |
| 2008/0093205 | A1 | * | 4/2008 | Borst | ...................... | B60R 22/48 200/61.58 B |

(Continued)

FOREIGN PATENT DOCUMENTS

| GB | 2133625 | * | 12/1982 | ............. H01H 13/02 |
| GB | 2133625 | A | 7/1984 | |

(Continued)

OTHER PUBLICATIONS

European Search Report dated May 9, 2016, in corresponding EP Patent Application No. 16150485.4.

*Primary Examiner* — Edwin A. Leon
*Assistant Examiner* — Iman Malakooti (57) ABSTRACT A thick film polymer membrane switch can be positioned within a seat belt buckle. The switch can detect if the seat belt buckle is fastened or unfastened. In one approach, an apparatus includes a housing having a cavity, an insertion member moveable within the cavity, a connector positioned within the cavity, and a switch positioned within the cavity, wherein movement of the insertion member causes the connector to connect or disconnect from the switch. In some approaches, the switch includes a first conductive element formed adjacent a first layer of flexible film, and a second conductive element formed adjacent a second layer of flexible film, wherein the first and second layers of flexible film are separated by a gap.

19 Claims, 11 Drawing Sheets (56) References Cited

U.S. PATENT DOCUMENTS

2012/0188070 A1   7/2012   Lanter

FOREIGN PATENT DOCUMENTS

| GB | 2326978 | * | 1/1997 | ............ H01H 13/52 |
| GB | 2326978 | A | 6/1999 | |

* cited by examiner

SEAT BELT BUCKLE

CROSS-REFERENCE TO RELATED APPLICATION

This application claims priority to U.S. Provisional Patent Application No. 62/103,535, filed Jan. 14, 2015, entitled "Seat Belt Buckle," and U.S. Provisional Patent Application No. 62/101,650, filed Jan. 9, 2015, entitled "Seat Belt Buckle," each of which is incorporated by reference herein in its entirety.

FIELD OF THE DISCLOSURE

This disclosure relates generally to the field of switches and more particularly to seat belt buckle switches.

BACKGROUND OF THE DISCLOSURE

Vehicle restraint systems, also referred to as "seat belts", are used to secure an occupant within a vehicle. A common vehicle restraint system includes a lap belt and a shoulder belt. Typically, the lap belt and the shoulder belt are connected together at one end and include a latch plate. The other end of the shoulder belt and lap belt is connected to the vehicle structure. A safety seatbelt buckle configured to receive the latch plate is also connected to the vehicle structure. When the buckle and the latch plate are connected (e.g., across an occupant's shoulder and waist), the vehicle restraint system may operate to restrain movement of the occupant, e.g., during breaking or a collision.

The buckle may identify whether a driver and/or an occupant wears the seatbelt. For this purpose, the buckle normally includes a mechanical switch such as a microswitch that may be operated with a tongue of the belt. In one approach, the switch is actuated in response to the insertion or removal of the tongue, so that an indicator, e.g., on an instrument panel, is activated.

Seat belt buckles can include switches or sensors that can be used to determine when a seat belt buckle is fastened or unfastened. Conventional seat belt buckle switches or sensors suffer from one or more problems including, for example, high manufacturing costs and/or high likelihoods of mechanical failure.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A need exists for an improved switch or sensor for a seat belt buckle that is durable with reduced installation complexity and lower costs. Approaches described herein provide an improved seat belt buckle switch.

In one approach, an apparatus includes a housing having a cavity, an insertion member moveable within the cavity, a connector positioned within the cavity, and a switch positioned within the cavity, wherein movement of the insertion member causes the connector to connect or disconnect from the switch. In this approach, the switch includes a first conductive element formed adjacent a first layer of flexible film, and a second conductive element formed adjacent a second layer of flexible film, wherein the first and second layers of flexible film are separated by a gap.

In another approach, an apparatus includes a housing having a first cavity and a second cavity, an insertion member moveable within the first cavity, a connector extending into the first cavity, and a switch positioned within the second cavity, wherein movement of the insertion member causes the connector to connect or disconnect from the switch. In this approach, the switch includes a first conductive element formed adjacent a first layer of flexible polymer film, and a second conductive element formed adjacent a second layer of flexible polymer film, wherein the first and second layers of flexible polymer film are separated by an air gap.

In yet another approach, an apparatus includes a housing having a cavity, an insertion member moveable within the cavity, a connector positioned within the cavity; and a switch positioned within the cavity, wherein movement of the insertion member causes the connector to connect or disconnect from the switch. In this approach, the switch includes an upper layer of flexible film having a conductive element formed thereon, a lower layer of flexible film adjacent the upper layer of flexible film, and a middle spacer layer disposed between the upper and lower layers of flexible film, the middle spacer layer defining an air gap.

BRIEF DESCRIPTION OF THE DRAWINGS

By way of example, specific embodiments of the disclosed device will now be described, with reference to the accompanying drawings.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

DETAILED DESCRIPTION

An apparatus in accordance with the present disclosure will now be described more fully hereinafter with reference to the accompanying drawings, where embodiments of the methods are shown. The apparatus may be embodied in many different forms and are not to be construed as being limited to the embodiments set forth herein. Instead, these embodiments are provided so this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts with respect to the geometry and orientation of a component of a device as appearing in the figures. The terminology will include the words specifically mentioned, derivatives thereof, and words of similar meaning and/or significance.

As used herein, an element or operation recited in the singular and proceeded with the word "a" or "an" is to be understood as including plural elements or operations, until such exclusion is explicitly recited. Furthermore, references to "one embodiment" of the present disclosure are not intended as limiting. Additional embodiments may also incorporating the recited features.

Figure 1:
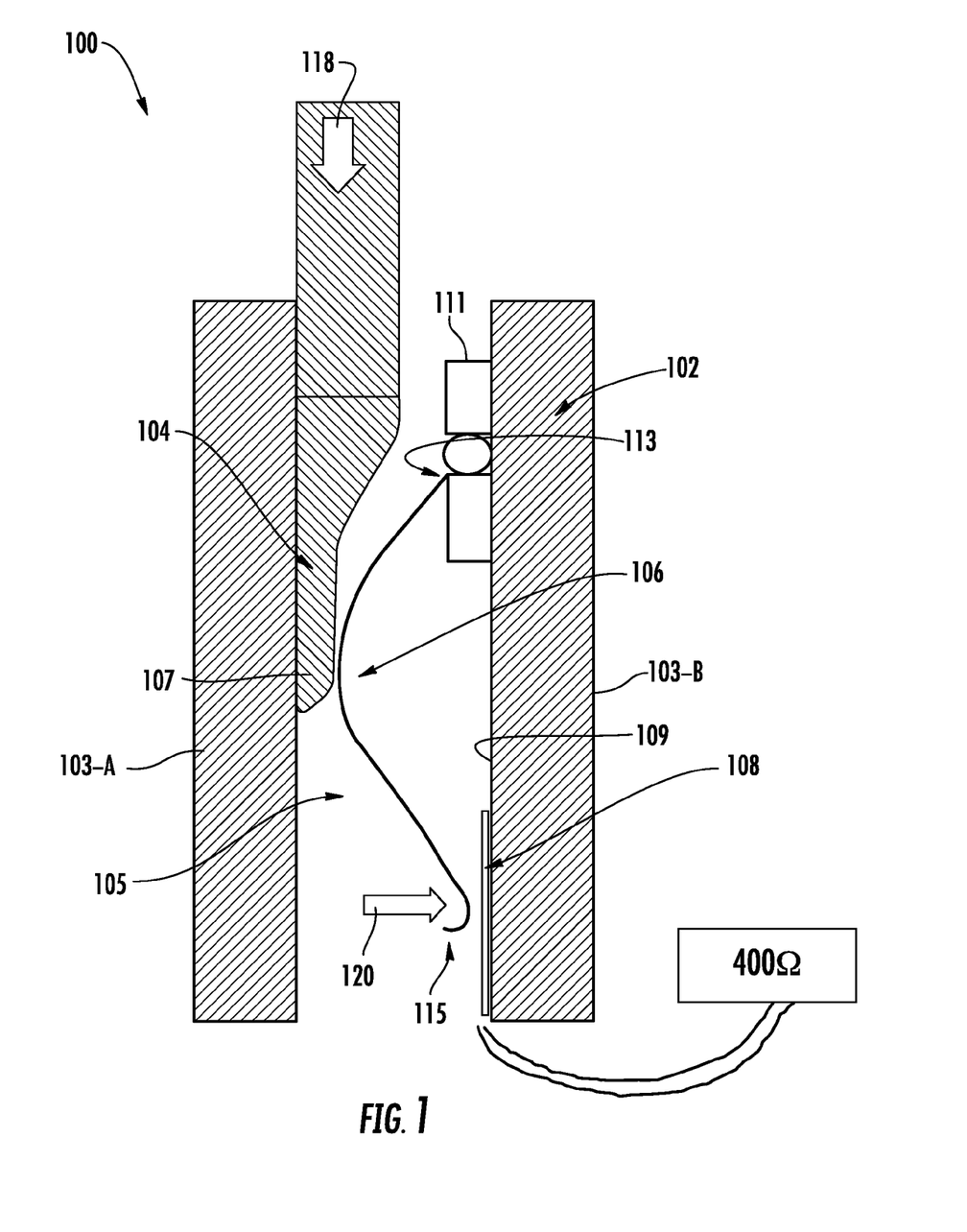
FIG. 1 illustrates an exemplary seat belt buckle switch in accordance with a first aspect of the present disclosure.

FIG. 1 illustrates an exemplary seat belt buckle 100. As shown, the seat belt buckle 100 includes a housing 102 and an insertion member 104. The housing 102 can include one or more portions 103A-B arranged to form a chamber or cavity 105 for accepting the insertion member 104. The housing 102 can be formed of a carrier molding in some non-limiting embodiments. An end portion 107 of the insertion member 104 can be a tongue portion dimensioned to fit within the cavity 105 provided by the housing 102. The insertion member 104 can move within the cavity 105 of the housing 102 during latching/unlatching of the seat belt buckle 100.

As further shown in FIG. 1, the seat belt buckle 100 can include a connector 106 and a switch 108. The connector 106 can be a spring such as, for example, a phosphor bronze spring. The connector 106 can be coupled or attached to an internal wall 109 or fastener portion 111 of the housing 102.

The connector 106 may protrude or be positioned within the cavity 105 of the housing 102 such that movement of the insertion member 104 within the cavity 105 can cause an end of the connector 106 to come into contact with the switch 108. That is, movement of the insertion member 104 can cause movement of the connector 106 such that the connector 106 can be actuated, e.g., connected or disconnected from the switch 108. The connector 106 may be bent or shaped such that it can be stabilized at one end 113 and unattached at a second end 115. Furthermore, the connector 106 can be bent or have an arcuate shape for making contact with the insertion member 104 along any portion of the connector 106 between the stabilized end 113 and the unattached end 115. Further, the unattached end 115 of the connector 106 can be bent, shaped or curled, for example as shown in FIG. 1. As will be appreciated, the connector 106 may take on any number of shapes/geometries.

In some embodiments, the insertion member 104 can be configured to move further into the cavity 105 of the housing 102 during latching or unlatching of the seat belt buckle 100. That is, the insertion member 104 can be configured to cause the connector 106 to come into contact with the switch 108 when the seat belt buckle 100 is either fastened or unfastened. Under either scenario, contact between the switch 108 and the connector 106 can signal whether or not the seat belt buckle 100 is latched or unlatched as appropriate.

In FIG. 1, a force 120 resulting from the insertion member 104 is removed from the connector 106, e.g., when the seat belt buckle 100 is unfastened, such that the connector 106 is not in contact with the switch 108. Under this scenario, the switch 108 can provide a relatively higher resistance (e.g., 400 Ohms or higher) as compared to the resistance provided by the switch 108 when the switch 108 and the connector 106 come into contact.

Figure 2:
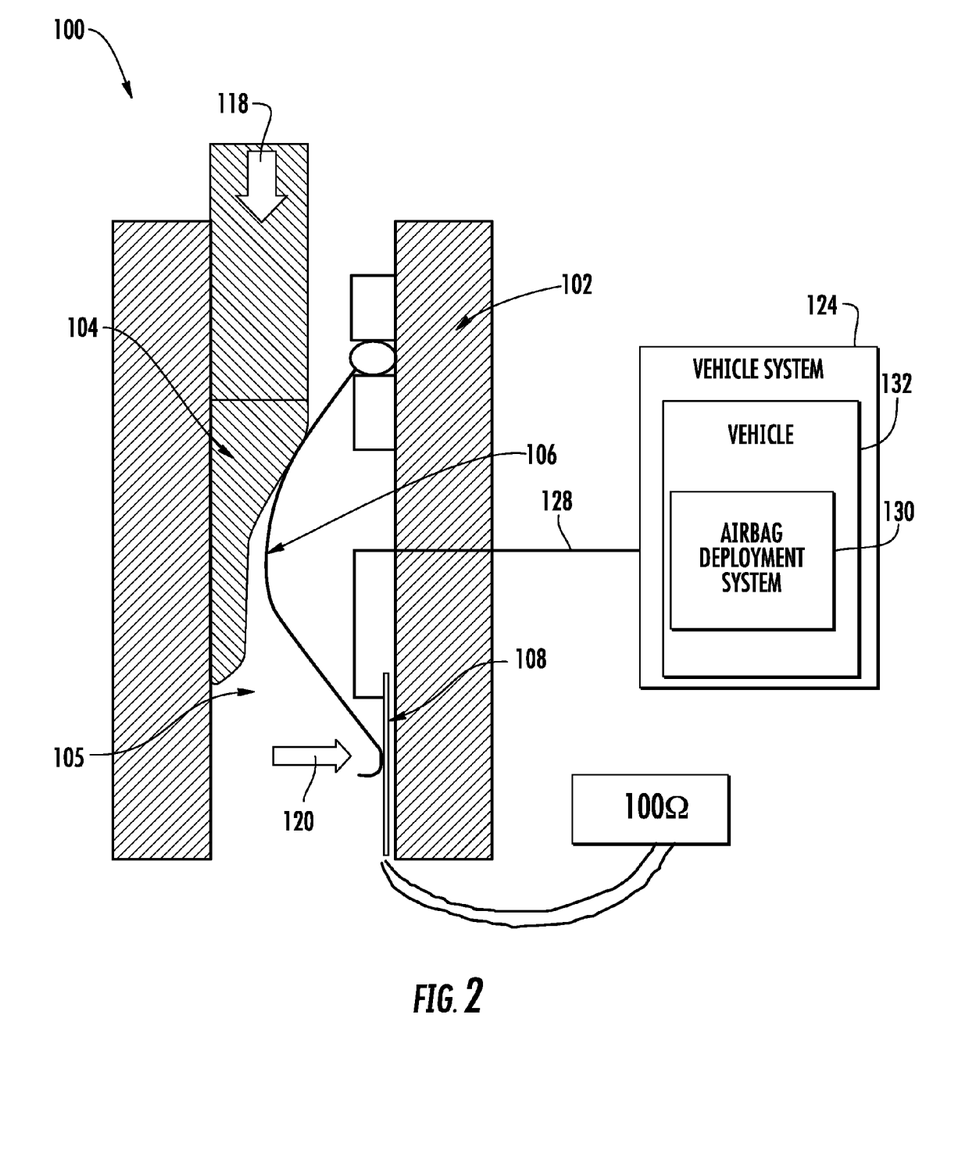
FIG. 2 illustrates operation of the exemplary seat belt buckle switch depicted in FIG. 1.

FIG. 2 illustrates the seat belt buckle 100 with the connector 106 in contact with the switch 108. As shown in FIG. 2, the insertion member 104 is positioned further inside of the cavity 105 of the housing 102. As a result, a force 118 from the insertion member 104 can be sufficient for applying a corresponding force 120 that causes the connector 106 to make contact with the switch 108. Under this scenario, the switch 108 can provide a relatively lower resistance (e.g., 100 Ohms or lower) as compared to the resistance provided by the switch 108 when the switch 108 and the connector 106 are not in contact (e.g., as shown in FIG. 1).

In some embodiments, the switch 108 may be a thick film polymer membrane switch. The switch 108 can be used to detect or determine when the seat belt buckle 100 is fastened (e.g., latched) or unfastened (e.g., unlatched). An output of the switch 108 can be provided to one or more components of a vehicle system 124. For example, an output 128 of the switch 108, which may signal when the seat belt buckle 100 is latched or unlatched, can be provided to an airbag deployment system 130 of a vehicle 132 and/or can be used to adjust operation of warning lights, alarms, and/or sounds of the vehicle 132.

The switch 108 can be comprised of multiple layers. As an example, an upper layer can be a flexible polymer film having a conductive ink screen printed thereon (e.g., to form conductive tracks). A middle layer of the switch 108 can be a polymer film that acts as a spacer to create an air gap. A lower layer of the switch 108 can include conductive tracks and can also include a resistive element printed thereon.

When a force acts on the upper layer of the switch 108 (e.g., when the connector 106 presses down onto the switch 108), the conductive ink screen/track of the upper layer can come into contact with the resistive track of the lower layer. This point of contact (e.g., when the switch 108 is closed) can be configured to provide a relatively lower resistance (e.g., 100 Ohms or lower) as compared to the resistance (e.g., 400 Ohms or higher) provided when the upper layer and lower layer of the switch 108 are not in contact (e.g., when the switch 108 is open). The lower layer of the membrane switch 108 can be an FR4 type PCB or can be a flexible polymer film such as, for example, polyester.

In some embodiments, FR4 (or FR-4) is a grade designation assigned to glass-reinforced epoxy laminate sheets, tubes, rods and PCBs, wherein "FR" stands for flame retardant, and denotes that safety of flammability of FR-4 is in compliance with the standard UL94V-0. FR4 is a composite material composed of woven fiberglass cloth with an epoxy resin binder that is flame resistant (e.g., self-extinguishing). FR4 may be created from the constituent materials epoxy resin, woven glass fabric reinforcement, brominated flame retardant, etc.

Figure 3:
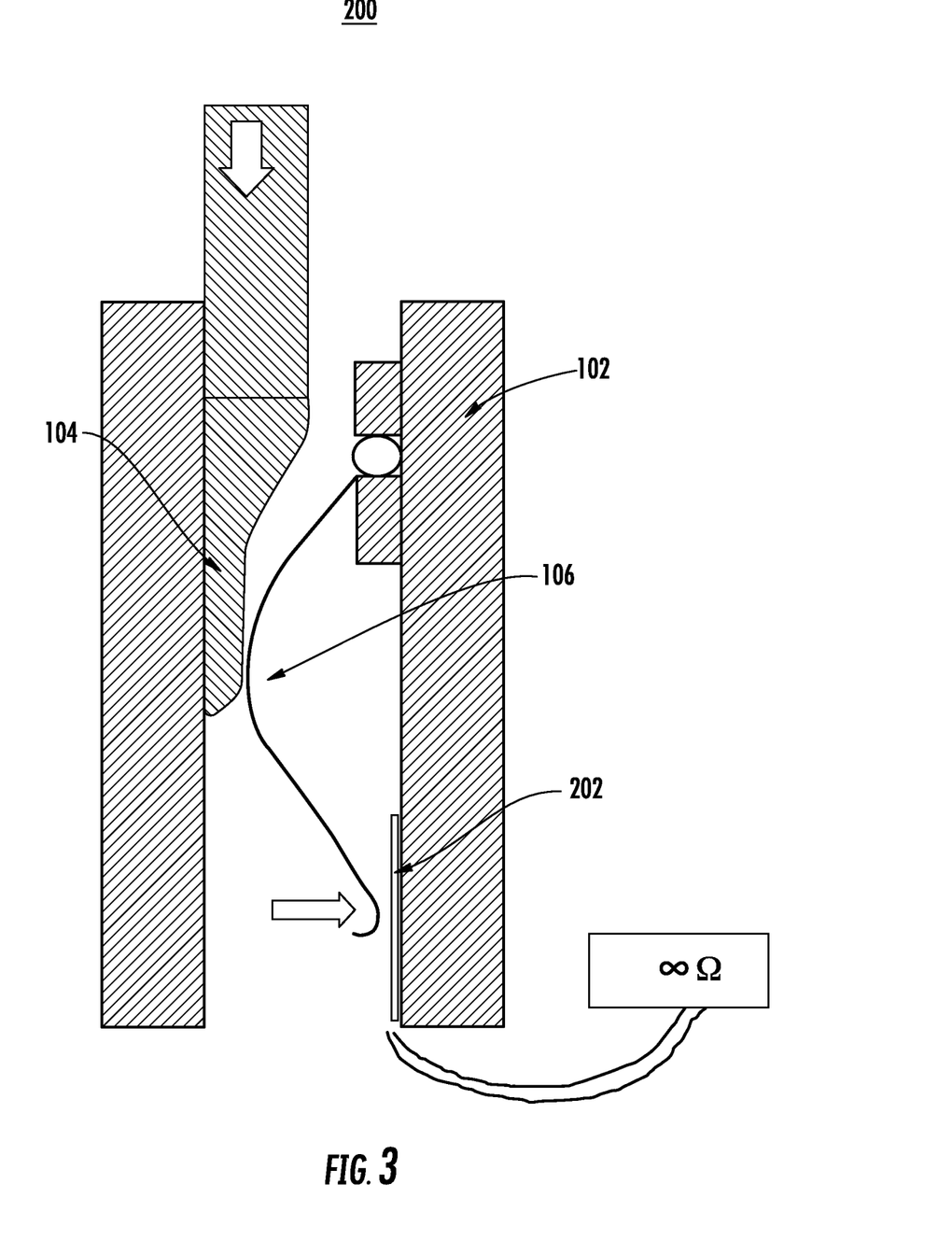
FIG. 3 illustrates an exemplary seat belt buckle switch in accordance with a second aspect of the present disclosure.
Figure 4:
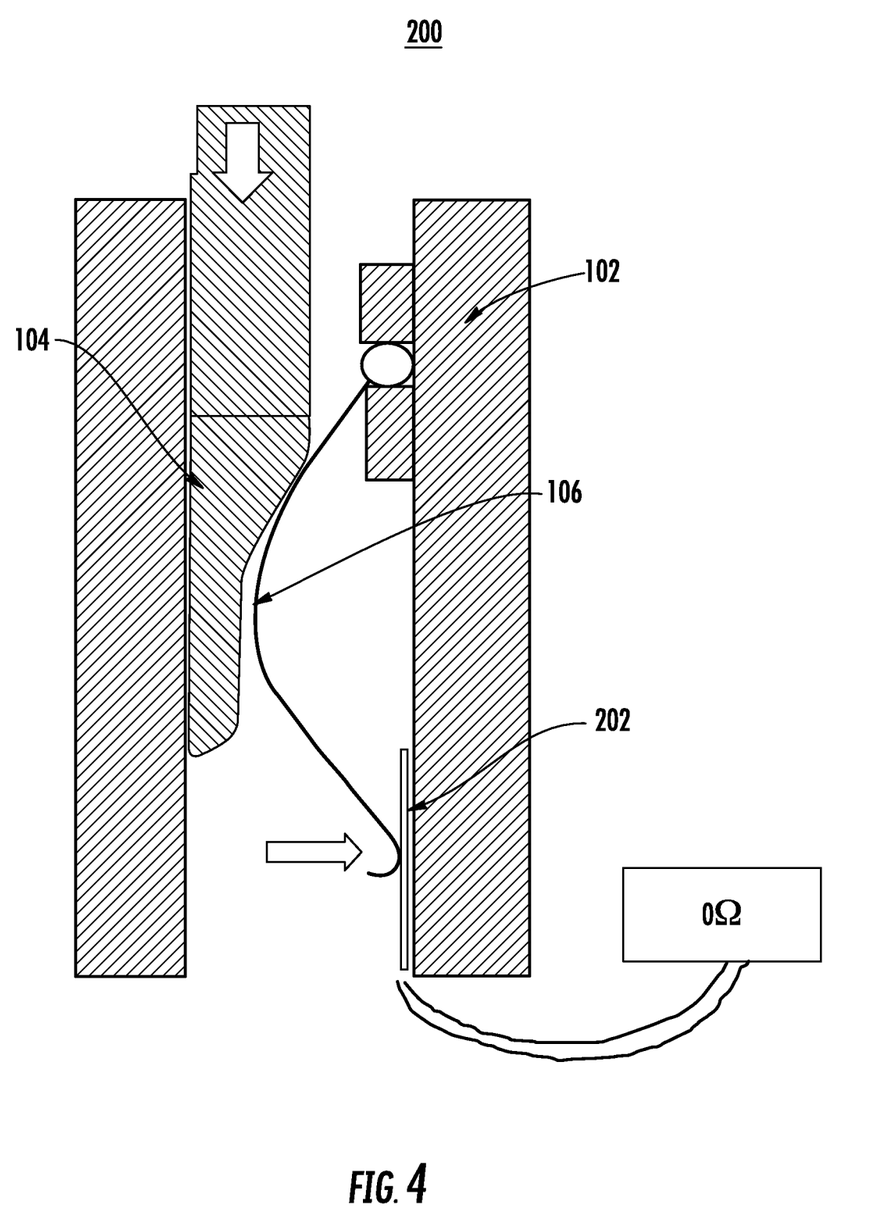
FIG. 4 illustrates operation of the exemplary seat belt buckle switch depicted in FIG. 3.

FIGS. 3 and 4 illustrate an exemplary seat belt buckle 200. As shown in FIGS. 3 and 4, the seat belt buckle 200 includes the housing 102, the insertion member 104, the connector 106, and a switch 202. The seat belt buckle 200 can operate similarly to the seat belt buckle 100. That is, the insertion member 104 can cause the connector 106 to connect or disconnect from the switch 202. Connecting or disconnecting the connector 106 from the switch 202 can be used to determine whether the seat belt buckle 200 is fastened or unfastened (e.g., depending on whether the insertion member 104 descends into the cavity of the housing 102 upon fastening or unfastening).

The switch 202 can also be a thick film polymer membrane switch. The switch 202 can include multiple layers. As an example, an upper layer of the switch 202 can be a flexible polymer film having a conductive ink screen printed thereon (e.g., to form conductive tracks). A middle layer of the switch 202 can be a polymer film that acts as a spacer to create an air gap. A lower layer of the switch 202 can also include a conductive ink track screen printed thereon. The lower layer of the membrane switch 202 can be an FR4 type PCB or can be a flexible polymer film such as, for example, polyester.

When the switch 202 is open (e.g., when the connector 106 is not connected or coupled to the switch 202 as illustrated in FIG. 3), the switch 202 can provide a relatively high resistance. For example, the switch 202 can substantially operate as an open circuit, thereby providing an effective infinite resistance. When the switch 202 is closed (e.g., when the connector 106 is connected or coupled to the switch 202 as illustrated in FIG. 4), the switch 202 can provide a relatively low resistance. For example, the switch 202 can substantially operate as a short circuit, thereby providing an effectively negligible amount of resistance. Based on the operational state of the switch 202, i.e., whether the switch 202 provides an open or short circuit, a state of the seat belt buckle 200 can be determined. For example, it may be determined whether the seat belt buckle 200 is fastened or unfastened. An output of the switch 202 from which this determination can be made can be provided to additional components of the vehicle, as discussed above.

Figure 5:
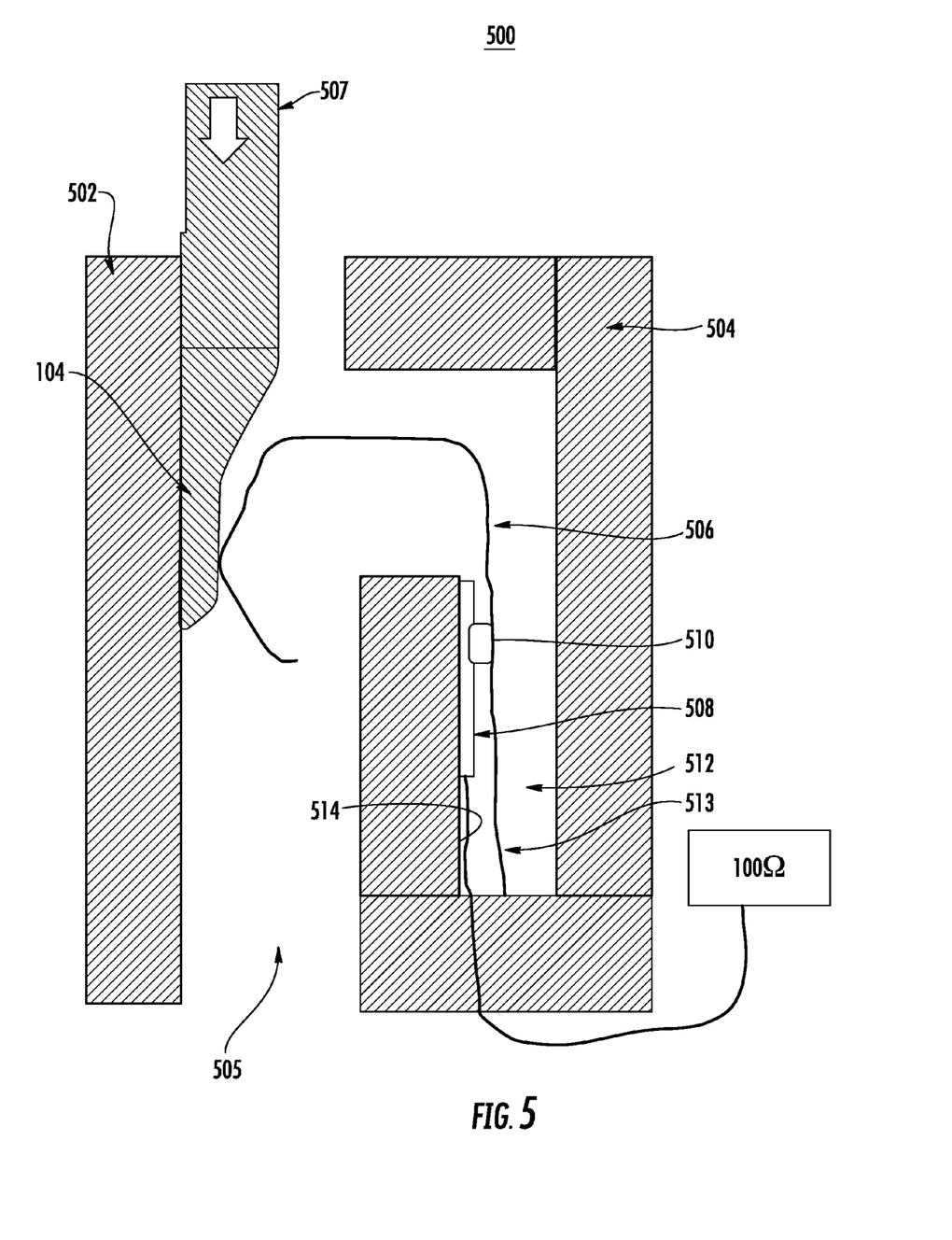
FIG. 5 illustrates an exemplary seat belt buckle switch in accordance with a third aspect of the present disclosure.
Figure 6:
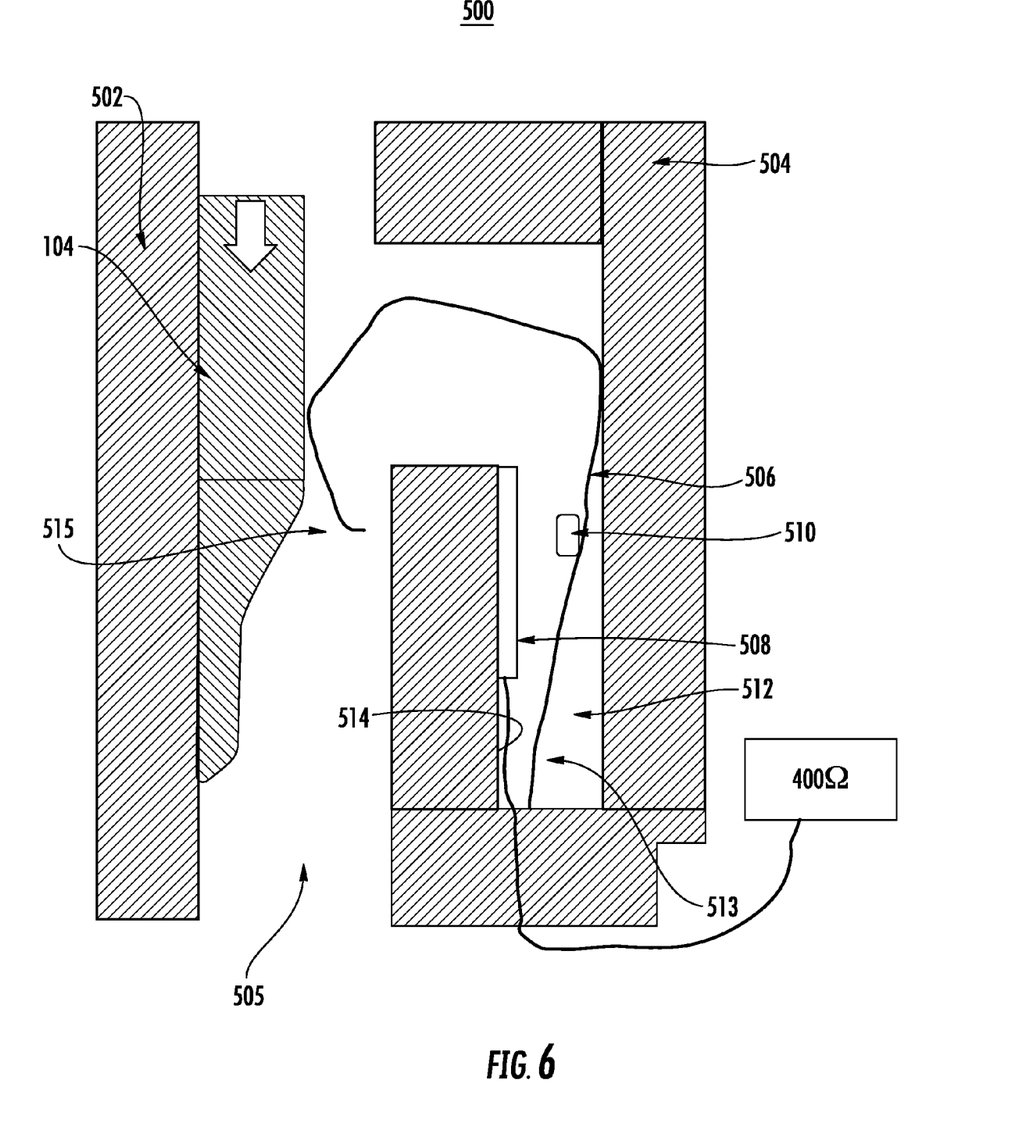
FIG. 6 illustrates operation of the exemplary seat belt buckle switch depicted in FIG. 5.

FIGS. 5 and 6 illustrate an exemplary seat belt buckle 500. As shown in FIGS. 5 and 6, the seat belt buckle 500 can include a first housing portion 502, a second housing portion 504, an insertion member 104, a connector 506, an extension member 510, and a switch 508. The extension member 510 can be formed as part of the connector 506 or can be a separate component coupled thereto, as serves as the point of contact for the connector 506.

The seat belt buckle 500 can operate similarly to seat belt buckles 100 and 200. In some embodiments, the insertion member 104 can cause the connector 506 (e.g., by way of the extension member 510) to connect or disconnect from the switch 508 (i.e., to make contact or not make contact with the switch 508). Connecting or disconnecting the connector 506 from the switch 508 can be used to determine whether the seat belt buckle 500 is fastened or unfastened (e.g., depending on whether the insertion member 104 descends into or moves out of the cavity formed between the first housing portion 502 and the second housing portion 504 upon fastening or unfastening).

As further shown in FIG. 5, the second housing portion 504 can be arranged to form a second cavity 512 adjacent a first cavity 505, wherein the first cavity 505 houses the insertion member 104. The switch 508 can be coupled or attached to an internal wall or portion within the chamber or cavity of the second housing portion 504 as shown in FIG. 5. The connector 506 can be coupled or attached to an internal wall or portion 514 within the chamber or cavity of the second housing portion 504 facing away from the first housing portion 502, as shown in FIG. 5. The connector 506 can protrude from or be positioned within the second cavity 512 of the second housing portion 504 and can extend into the first cavity 505 formed between the first housing portion 502 and the second housing portion 504. The connector 506 can make contact with the switch 508 by the extension member 510. In some embodiments, the connector 506 can be bent or shaped such that it can be stabilized at one end 513 within the second cavity 512 of the second housing portion 504, and the connector 506 can be unattached at a second end 515. The connector 506 can be bent or shaped to make contact with the insertion member 104 along any portion of the connector 506 between the stabilized end 513 and the unattached end 515. Further, the unattached end 515 of the connector 506 can be bent, shaped or curled, for example as shown in FIG. 5.

As further shown in FIGS. 5 and 6, movement of the insertion member 104 within the first cavity 505 formed between the first housing portion 502 and the second housing portion 504 can cause the connector 506 to discontinue contact (e.g., disconnect) with the switch 508. As shown in FIG. 5, a portion 507 of the insertion member 104 is positioned outside of the first cavity 505 formed between the first housing portion 502 and the second housing portion 504. Because a substantial portion of the insertion member 104 is positioned outside of the first cavity 505, the insertion member 104 does not provide sufficient force on the connector 506 to cause the extension member 510 to move away from the switch 508. Consequently, the extension member 510 of the connector 506 makes contact with/presses down on the switch 508. When the extension member 510 makes contact with/presses down on the switch 508 (e.g., when the switch 508 is closed), the switch 508 can be configured to provide a relatively lower resistance (e.g., 100 Ohms or lower) as compared to the resistance provided by the switch 508 when the extension member 510 does not make contact with/does not press down on the switch 508 (e.g., when the switch 508 is open).

As shown in FIG. 6, the insertion member 104 is positioned further inside of the cavity formed between the first housing portion 502 and the second housing portion 504. As a result, a force from the insertion member 104 is applied to the connector 506, which in turn moves the extension member 510 away from the switch 508. Therefore, the connector 506/extension member 510 no longer presses down/makes contact with the switch 508. Under this scenario, the switch 508 can be considered to be open. When the extension member 510/connector 506 is no longer in contact with the switch 508, the switch 508 can provide a relatively higher resistance (e.g., 400 Ohms or higher) as compared to the resistance provided by the switch 508 when the switch 508 and the connector 506 come into contact (e.g., when the switch 508 is closed). Based on the operational state of the switch 508, i.e., whether the switch 508 provides relatively higher or lower resistance, a state of the seat belt buckle 500 can be determined, for example, whether the seat belt buckle 500 is fastened or unfastened.

Further, the seat belt buckle 500 can be configured to be fastened or unfastened, with the switch 508 providing either relatively higher resistance or relatively lower resistance. An output of the switch 508, from which this determination may be made, can be provided to additional components of a vehicle, for example as discussed above. As with the connector 106 described above, the connector 506 may be a phosphor bronze spring operating as a cantilever. The extension member 510 may also be formed of phosphor bronze. The switch 508 can operate and/or be formed similarly to the switch 108.

Figure 7:
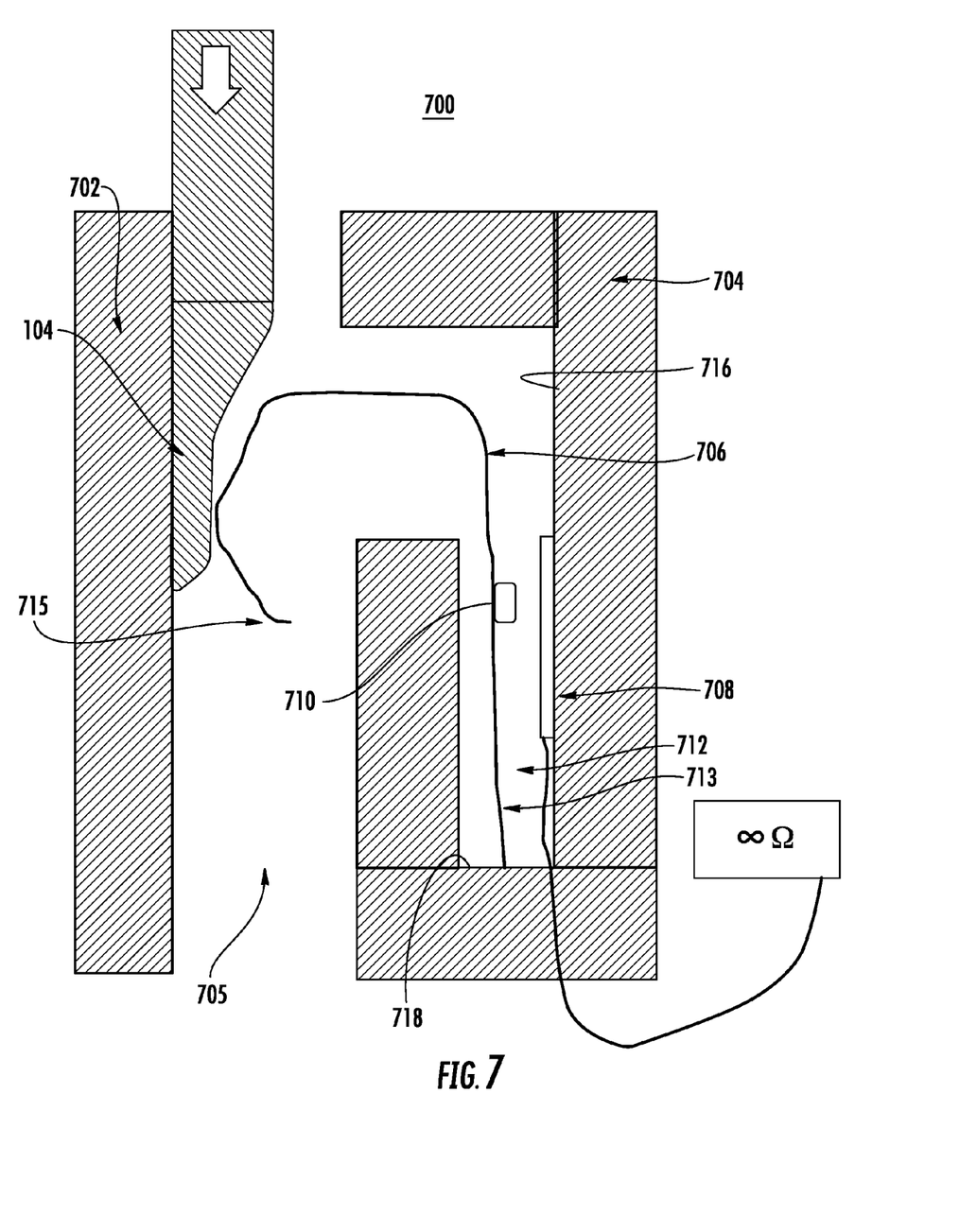
FIG. 7 illustrates an exemplary seat belt buckle switch in accordance with a fourth aspect of the present disclosure.
Figure 8:
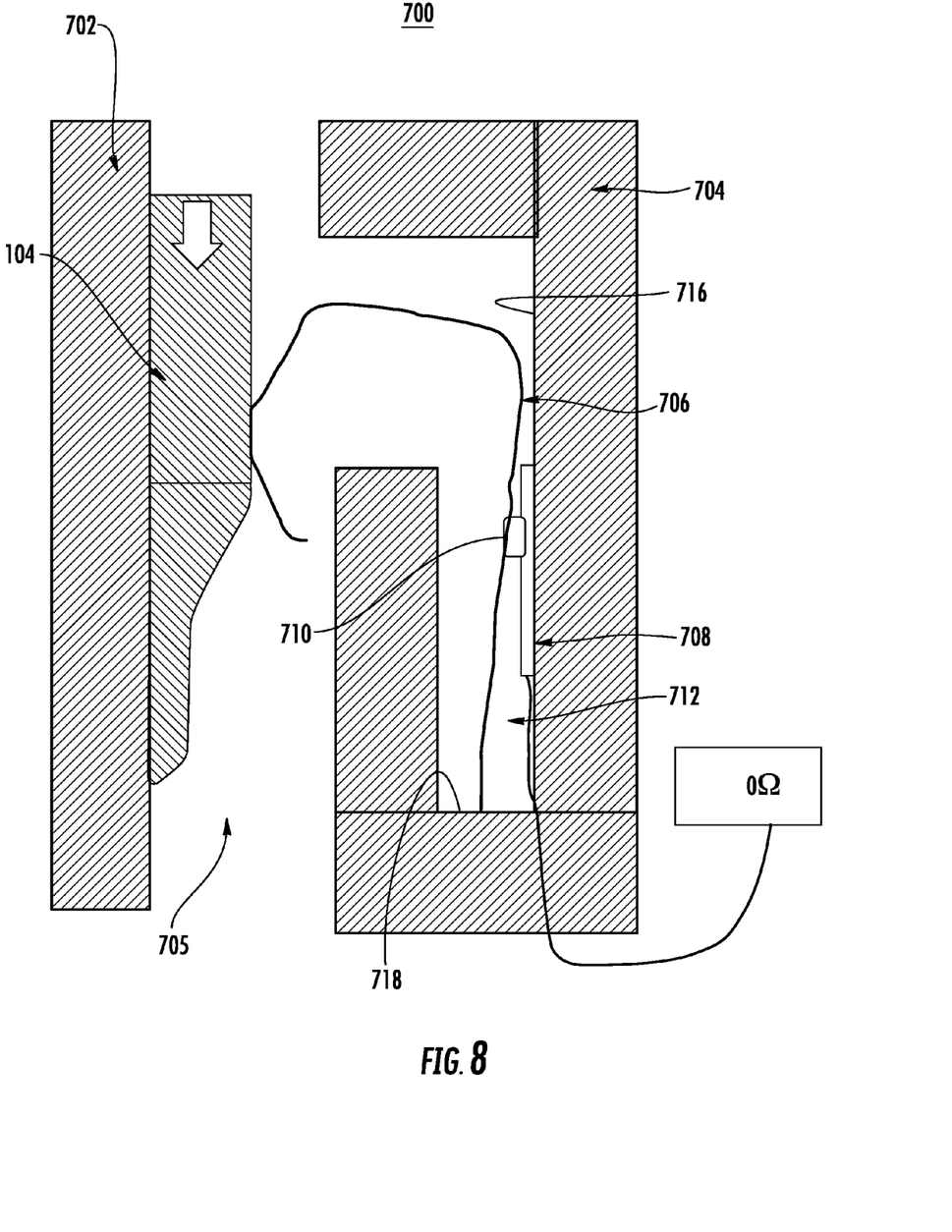
FIG. 8 illustrates operation of the exemplary seat belt buckle switch depicted in FIG. 7.

FIGS. 7 and 8 illustrate an exemplary seat belt buckle 700. As shown in FIGS. 7 and 8, the seat belt buckle 700 includes a first housing portion 702, a second housing portion 704, an insertion member 104, a connector 706, an extension member 710, and a switch 708. The seat belt buckle 700 can operate similarly to seat belt buckles 100, 200, and 500. That is, the insertion member 104 can cause the connector 706 to connect or disconnect from the switch 708 (i.e., to make contact or not make contact with the switch 708). Connecting or disconnecting the connector 706 from the switch 708 (e.g., by way of the extension member 710) can be used to determine whether the seat belt buckle 700 is fastened or unfastened, for example, depending on whether the insertion member 104 descends into the cavity formed between the first housing portion 702 and the second housing portion 704 upon fastening or unfastening.

As further shown in FIG. 7, the second housing portion 704 can be arranged to form a chamber or second cavity 712. The switch 708 can be coupled or attached to an internal wall or portion 716 within the chamber or second cavity 712 of the second housing portion 704 facing the first housing portion 702, as shown in FIG. 7. The connector 706 can be coupled or attached to a bottom wall or portion 718 within the chamber or second cavity 712 of the second housing portion 704, as shown in FIG. 7. The connector 706 can protrude from or be positioned within the second cavity 712 of the second housing portion 704 and extend into the cavity 705 formed between the first housing portion 702 and the second housing portion 704. The connector 706 can make contact with the switch 708 by the extension member 710.

In some embodiments, the connector 706 can be bent or shaped such that it can be stabilized at one end 713 within the second cavity 712 (e.g., bottom wall or portion 718) of the second housing portion 704 and can be unattached at a second end 715. The connector 706 can be bent or shaped to make contact with the insertion member 104 along any portion of the connector 706 between the stabilized end 713 and the unattached end 715. Further, the unattached end 715 of the connector 706 can be bent, shaped or curled, for example as shown in FIG. 7. The extension member 710 can be formed as part of the connector 706 or can be a separate component coupled thereto.

As further shown in FIGS. 7 and 8, a substantial portion of the insertion member 104 may be removed from within the cavity 705 formed between the first housing portion 702 and the second housing portion 704, which can, in turn, cause the extension member 710 and the connector 706 to discontinue contact with the switch 708. Conversely, the insertion member 104 can descend further into the cavity 705 formed between the first housing portion 702 and the second housing portion 704, and can cause the connector 706/extension member 710 to make contact or press down on the switch 708 (as illustrated in FIG. 8).

As shown in FIG. 7, the insertion member 104 does not does provide sufficient force to cause the connector 706 and the extension member 710 to move toward the switch 708. Under this scenario, when the connector 706/extension member 710 does not make contact with/press down on the switch 708, the switch 708 can be considered to be open. The switch 708, when open, can provide a relatively high resistance (e.g., infinity or effectively an open circuit).

As shown in FIG. 8, the insertion member 104 is positioned further inside of the cavity 705 formed between the first housing portion 702 and the second housing portion 704. As a result, the insertion member 104 can apply a force on the connector 706 that can cause the connector 706 and the extension member 710 to move toward and eventually make contact with/press down on the switch 708. Under this scenario, when the connector 706/extension member 710 makes contact with/presses down on the switch 708, the switch 708 can be considered to be closed. The switch 708, when closed, can provide a relatively lower resistance. As an example, the switch 708 can substantially operate as a short circuit, thereby providing an effectively negligible amount of resistance. Based on the operational state of the switch 708, i.e., whether the switch 708 provides an open or short circuit, a state of the seat belt buckle 700 can be determined, for example, whether the seat belt buckle 700 is fastened or unfastened.

In some embodiments, the seat belt buckle 700 can be configured to be fastened or unfastened with the switch 708 providing either relatively higher resistance (e.g., an open circuit) or relatively lower resistance (e.g., a short circuit). An output of the switch 708 from which this determination can be made can be provided to additional components of a vehicle as discussed above. As with the connector 106 described above, the connector 706 can be a phosphor bronze spring and can operate as a cantilever. The extension member 710 can also be formed of phosphor bronze. The switch 708 can operate and/or be formed similarly to the switch 202.

Figure 9:
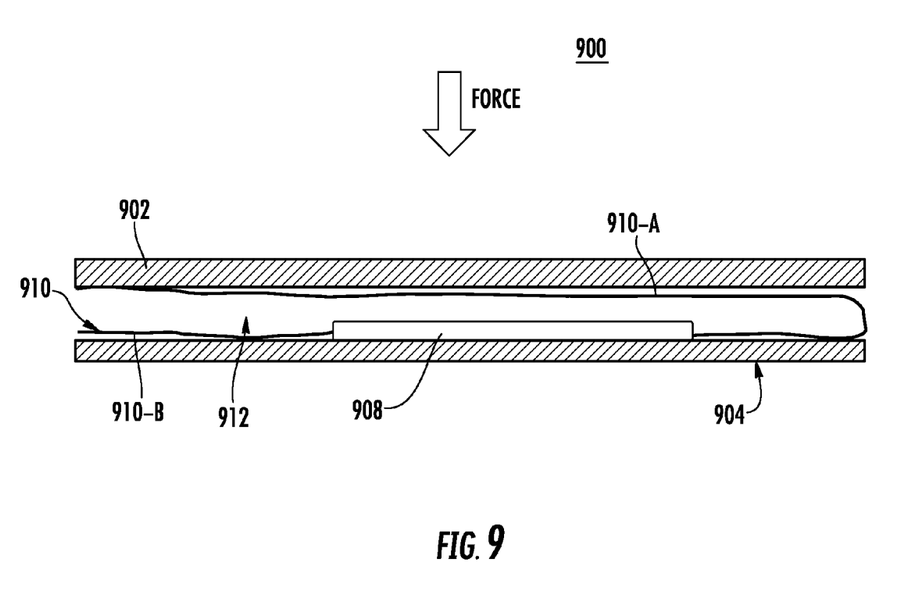
FIG. 9 illustrates an exemplary polymer membrane switch in accordance with the present disclosure.

FIG. 9 illustrates an exemplary polymer membrane switch 900. The polymer membrane switch 900 can be representative of an embodiment of switches 108, 202, 508, and 708 described above. The polymer membrane switch 900 may include a first layer 902, a second layer 904, a conductor 910, and a resistive element 908.

The first layer 902 (e.g., such as an upper layer) and the second layer 904 (e.g., such as a bottom layer) can each be formed from or made of a flexible polymer film. The second layer 904 can be made to be more rigid than the first layer 902 in certain embodiments. A gap or space 912 can be positioned between the first layer 902 and the second layer 904. The conductor 910 may include a first conductive element 910-A and a second conductive element 910-B, and may be positioned between the first layer 902 and the second layer 904. The conductor 910 may be one continuous conductor (such as, for example, a conductive metal) such that the first and second conductive elements 910A-B are integrally coupled. The conductor 910 can be coupled to the resistive element 908.

When no force acts on the switch 900, that is, when the first layer 902 is not pressed down toward the lower layer 904, the switch 900 can provide a relatively high resistance (e.g., approximately 400 Ohms or higher). The switch 900 can provide a relatively higher resistance in this state since any current through the conductor 910 must traverse the entirety of the resistive element 908. This relatively higher resistance provided by the switch 900 in this operational state can be provided between the terminal ends of the conductor 910 as shown in FIG. 9.

When a force acts on the first layer 902 of the switch 900 (e.g., when a connector such as the connector 106 or the connector 506/extension member 510 presses down on the first layer 902), the circuit path provided by the conductor 910 is reduced. That is, the portion of the conductor 910 adjacent to the first layer 902 presses down and makes contact with the resistive element 908 and the portion of the conductor 910 adjacent to the second layer 904. The switch 900 can provide a relatively lower resistance in this state since any current through the conductor 910 must traverse a shorter circuit path and specifically traverses less than the entirety of the resistive element 908. The relatively lower resistance provided by the switch 900 in this operation state can be 100 Ohms or lower. This relatively lower resistance provided by the switch 900 in this operational state can be provided between the terminal ends of the conductor 910 as shown in FIG. 9. In effect, the conductor 910 is squeezed down onto itself, thereby making a circuit path for a current that traverses less than the entire conductor 910 and the entire resistive element 908.

Figure 10:
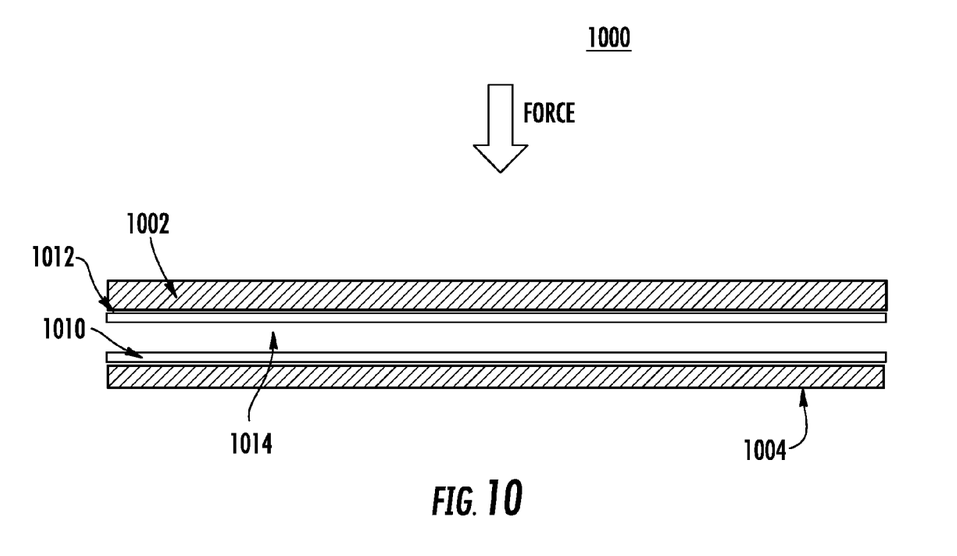
FIG. 10 illustrates an exemplary polymer membrane switch in accordance with a second aspect of the present disclosure.

FIG. 10 illustrates an exemplary polymer membrane switch 1000. The polymer membrane switch 1000 can be representative of an embodiment of the switches 108, 202, 508, and 708 described above. The polymer membrane switch 1000 may include a first layer 1002, a second layer 1004, a first conductor 1012, and a second conductor 1010.

The first layer 1002 (e.g., such as an upper layer) and the second layer 1004 (e.g., such as a bottom layer) can be a made from or formed by a flexible polymer film. The second layer 1004 can be made to be more rigid than the first layer 1002 in certain embodiments. The first layer 1002 and the second layer 1004 may be separated such that a space or gap 1014 is positioned between the first layer 1002 and the second layer 1004. The first conductor 1010 can be positioned adjacent to the first layer 1002 (or attached or coupled thereto). The second conductor 1010 can be positioned adjacent to the second layer 1004 (or attached or coupled thereto).

When no force acts on the switch 1000, that is, when the first layer 1002 is not pressed down toward the lower layer 1004, the switch can provide a relatively higher resistance (e.g., approximately infinite resistance or an open circuit). The switch 1000 can provide a relatively higher resistance in this state since no current can flow between the first and second conductors 1012 and 1010 (since the conductors 1012 and 1010 are not touching or in contact with one another). This relatively higher resistance provided by the switch 1000 in this operational state can be provided between the terminal ends of the conductor 1000, that is, a resistance as measured between the conductors 1012 and 1010 can effectively provide infinite resistance (since the conductors 1012 and 1010 form an open circuit when no in contact with one another).

When a force does act on the switch 1000, that is, when the first layer 1002 is pressed down toward the lower layer 1004, the switch can provide a relatively lower resistance (e.g., approximately zero resistance or a short circuit). The switch 1000 can provide a lower resistance in this state since the conductors 1012 and 1010 can be forced to come into contact with one another. As a result, a current can flow between the first and second conductors 1012 and 1010 with no resistance because there are no resistive elements formed by the circuit path of the first and second conductors 1012 and 1010 when they come into contact with one another. This relatively lower resistance provided by the switch 1000 in this operational state can be provided between the terminal ends of the conductor 1000, that is, a resistance as measured between the conductors 1012 and 1010 when the conductors are touching can effectively provide zero resistance because the conductors 1012 and 1010 form a short circuit.

The conductor 910, the conductor 1012, and the conductor 1010 can be formed in relation to switches 108 and 202 as a conductive ink screen by directly forming a circuit on the surface of the respective layers using a technique such as a screen printing method after processing metal powder into an ink.

Figure 11A:
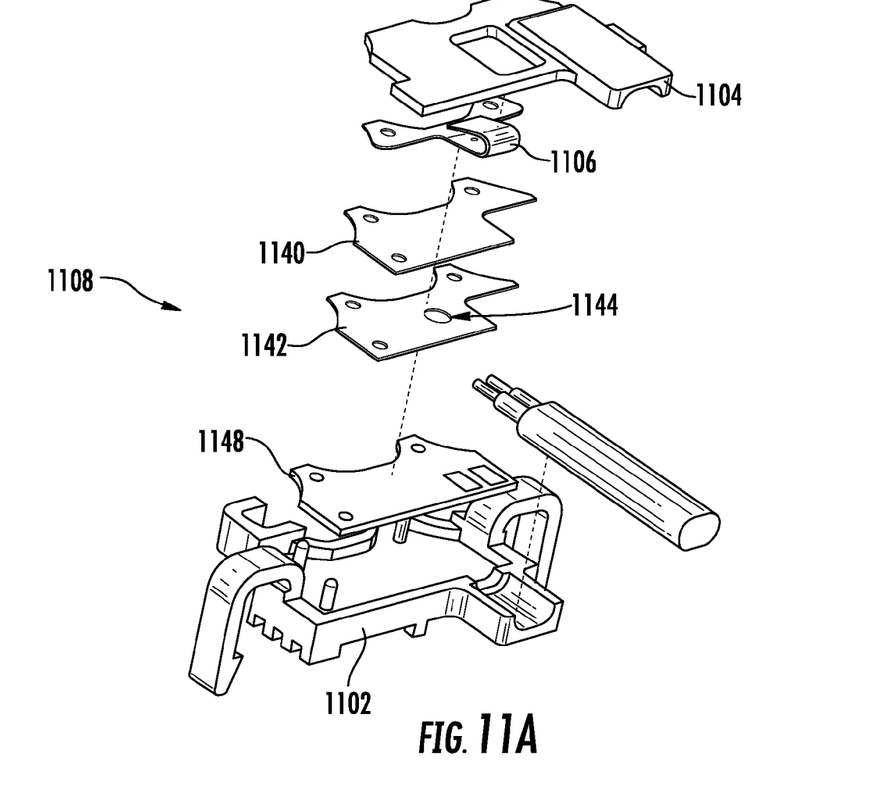
FIGS. 11A-B illustrate an exemplary polymer membrane switch in accordance with aspects of the present disclosure.
Figure 11B:
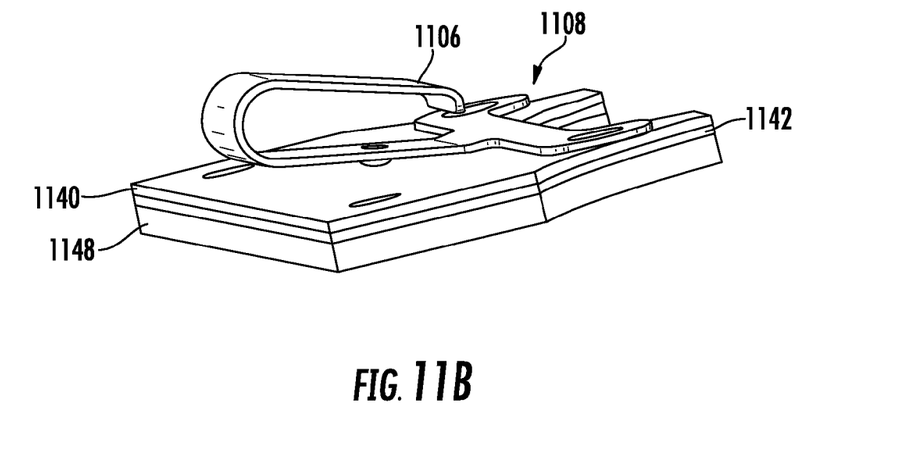

FIGS. 11A-B illustrate another exemplary polymer membrane switch. For example, as shown, an upper layer 1140 can be a flexible polymer film having a conductive ink screen printed thereon (e.g., to form conductive tracks). A middle layer 1142 of the switch 1108 can be a polymer film that acts as a spacer to create an air gap 1144. A lower layer 1148 of the switch 1108 can include conductive tracks and can also include a resistive element printed thereon. The switch 1108 is provided within a housing having a first housing portion 1102 and a second housing portion 1104.

During use, when a force acts on the upper layer of the switch 1108 (e.g., when the connector 1106 presses down onto the switch 1108), the conductive ink screen/track of the upper layer 1140 can come into contact with the resistive track of the lower layer 1148. This point of contact (e.g., when the switch 1108 is closed) can be configured to provide a relatively lower resistance (e.g., 100 Ohms or lower) as compared to the resistance (e.g., 400 Ohms or higher) provided when the upper layer 1140 and lower layer 1148 of the switch 1108 are not in contact (e.g., when the switch 1108 is open). The lower layer 1140 of the membrane switch 1108 can be an FR4 type PCB or can be a flexible polymer film such as, for example, polyester.

While the present disclosure has been disclosed with reference to certain embodiments, numerous modifications, alterations and changes to the described embodiments are possible without departing from the sphere and scope of the present disclosure.

The invention claimed is:

1. An apparatus, comprising:
  a housing having a cavity;
  an insertion member moveable within the cavity;
  a connector positioned within the cavity; and
  a switch positioned within the cavity, wherein movement of the insertion member causes the connector to connect or disconnect from the switch, wherein the switch comprises:
    a first layer of flexible film and a second layer of flexible film separated by a gap; and
    a conductor and a resistive element connected in series and disposed within the gap, wherein a portion of the conductor overlaps the resistive element and can be moved into and out of contact with the resistive element, and wherein the conductor extends between the resistive element and one of the first layer of flexible film and the second layer of flexible film.

2. The apparatus of claim 1, wherein the resistive element is printed on the second layer of flexible film.

3. The apparatus of claim 1, wherein the second layer of flexible film is formed from a printed circuit board (PCB).

4. The apparatus of claim 1, wherein the first and second layers of flexible film are formed from a flexible polymer.

5. The apparatus of claim 1, wherein the switch further comprises a middle layer of flexible film disposed between the first and second layers of flexible film, the middle layer of flexible film arranged as a spacer to create an air gap.

6. The apparatus of claim 1, wherein the connector is a spring.

7. The apparatus of claim 6, wherein the spring is a phosphor bronze spring coupled to an internal wall or a fastener portion of the housing.

8. The apparatus of claim 1, wherein the connector is connected to the switch when the insertion member is moved into the cavity toward to the switch.

9. The apparatus of claim 1, wherein the connector is disconnected from the switch when the insertion member is moved away from the switch.

10. The apparatus of claim 1, further comprising a second cavity defined by the housing.

11. The apparatus of claim 10, wherein the connector extends from the second cavity into the cavity.

12. The apparatus of claim 10, wherein the connector is coupled to the housing within the second cavity.

13. The apparatus of claim 1, wherein an output of the switch is provided to a component of a vehicle.

14. An apparatus, comprising:
  a housing having a first cavity and a second cavity;

an insertion member moveable within the first cavity;
a connector extending into the first cavity; and
a switch positioned within the second cavity, wherein movement of the insertion member causes the connector to connect or disconnect from the switch, wherein the switch comprises:
   a first layer of flexible polymer film and a second layer of flexible polymer film separated by an air gap; and
   a conductor and a resistive element connected in series and disposed within the gap, wherein a portion of the conductor overlaps the resistive element and can be moved into and out of contact with the resistive element, and wherein the conductor extends between the resistive element and one of the first layer of flexible polymer film and the second layer of flexible polymer film.

15. The apparatus of claim 14, wherein the resistive element is printed on the second layer of flexible polymer film.

16. The apparatus of claim 14, wherein the second layer of flexible polymer film is formed from a printed circuit board (PCB).

17. The apparatus of claim 14, wherein the switch further comprises a middle layer of flexible film disposed between the first and second layers of flexible film, the middle layer of flexible film arranged as a spacer to create the air gap.

18. The apparatus of claim 14, wherein the first conductive element and the second conductive element are integrally connected.

19. An apparatus, comprising:
a housing having a cavity;
an insertion member moveable within the cavity;
a connector positioned within the cavity; and
a switch positioned within the cavity, wherein movement of the insertion member causes the connector to connect or disconnect from the switch, wherein the switch comprises:
   an upper layer of flexible film;
   a lower layer of flexible film;
   a middle spacer layer disposed between the upper and lower layers of flexible film, the middle spacer layer defining an air gap; and
   a conductor and a resistive element connected in series and disposed within the gap, wherein a portion of the conductor overlaps the resistive element and can be moved into and out of contact with the resistive element, and wherein the conductor extends between the resistive element and one of the upper layer of flexible film and the lower layer of flexible film.

* * * * *